United States Patent
Tamakoshi et al.

(10) Patent No.: US 7,934,771 B2
(45) Date of Patent: May 3, 2011

(54) SIDE IMPACT RESPONSIVE VEHICLE ARMREST

(75) Inventors: Koji Tamakoshi, Susono (JP); Kazuhiro Seki, Aichi-ken (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 317 days.

(21) Appl. No.: 11/920,142

(22) PCT Filed: May 3, 2006

(86) PCT No.: PCT/IB2006/001145
§ 371 (c)(1),
(2), (4) Date: Nov. 9, 2007

(87) PCT Pub. No.: WO2006/120527
PCT Pub. Date: Nov. 16, 2006

(65) Prior Publication Data
US 2009/0045663 A1  Feb. 19, 2009

(30) Foreign Application Priority Data
May 11, 2005  (JP) ................... 2005-138873

(51) Int. Cl.
*B60N 2/42* (2006.01)
(52) U.S. Cl. .................................................. 297/216.1
(58) Field of Classification Search ............... 297/216.1, 297/115, 116, 411.29, 411.26, 411.37, 411.38, 297/411.31, 411.3, 411.2, 216.13
See application file for complete search history.

(56) References Cited

U.S. PATENT DOCUMENTS

| 3,951,452 | A  | * | 4/1976  | Harder, Jr. ............... 297/411.31 |
| 4,270,798 | A  | * | 6/1981  | Harder, Jr. ............... 297/411.31 |
| 4,881,754 | A  |   | 11/1989 | Lütze et al. |
| 6,142,563 | A  |   | 11/2000 | Townsend et al. |
| 6,709,063 | B1 | * | 3/2004  | Furukawa ..................... 297/488 |
| 7,195,312 | B2 | * | 3/2007  | Crossman et al. ......... 297/216.1 |

FOREIGN PATENT DOCUMENTS

| DE | 100 59 842 A1 | 7/2002 |
| DE | 102 44 506 A1 | 4/2004 |
| JP | A-07 194462 | 8/1995 |
| JP | 9-104273 | 4/1997 |
| JP | 09-109754 | 4/1997 |
| JP | 10-310012 | 11/1998 |
| JP | 2002-046520 | 2/2002 |
| JP | 2002-527280 | 8/2002 |

OTHER PUBLICATIONS

International Search Report.
Written Opinion of the ISA.
Office Action from the Japanese Patent Office for JP 2005-138873.

* cited by examiner

*Primary Examiner* — Milton Nelson, Jr.
(74) *Attorney, Agent, or Firm* — Finnegan, Henderson, Farabow, Garrett & Dunner, LLP

(57) ABSTRACT

An armrest frame (5A) bends at a hinge groove (5A2), which serves as a weak portion, when an impact load is applied to the armrest frame (5A) in an armrest (5) following a side impact with another vehicle. As a result, the armrest (5) is allowed to move toward the inside, in the vehicle width direction, during a side impact with another vehicle, thus ensuring the movement of a seated individual toward the inside, in the vehicle width direction. The vehicle armrest (5) also provides the same sense of stability as an armrest as a conventional armrest during normal use at times other than when there is a side impact with another vehicle.

13 Claims, 21 Drawing Sheets

SIDE IMPACT RESPONSIVE VEHICLE ARMREST

BACKGROUND OF THE INVENTION

1. Field of the Invention

The invention relates to an armrest attached to a side portion of a seat, back of a vehicle seat. More particularly, the invention relates to a vehicle armrest, which respond to a side impact with another vehicle.

2. Description of the Related Art

A vehicle seat is typically provided with an armrest to allow the seated individual to rest his/her arm on. This armrest is able to be raised and lowered at the side portion of the seat back so as not to impede getting into and out of the vehicle.

Japanese Patent Application Publication No. JP-A-7-194462, for example, discloses one such armrest. This armrest is structured such that, even if it is in a lowered position (hereinafter also referred to as "in-use position"), it rotates horizontally toward the side of the seat back when a load of a fixed amount or more is applied to it in a direction toward the side of the seat back so that it will not get in the way when a seated individual gets out of the vehicle or moves to an adjacent seat.

With the vehicle armrest disclosed in Japanese Patent Application Publication No. JP-A-7-194462, however, the armrest may also rotate horizontally toward the side of the seat back inadvertently if the weight of the seated individual shifts toward the armrest side as it might when the vehicle is turning, for example. This inadvertent rotation of the armrest may result in a loss of a sense of stability during use.

SUMMARY OF THE INVENTION

This invention thus provides a vehicle armrest which provides the same sense of stability during use as an armrest as a conventional armrest, and can also ensure the movement of a seated individual toward the inside, in the vehicle width direction, during a side impact with another vehicle.

Thus, a first aspect of the invention relates to an armrest mounted to a side portion that is toward the inside, in the vehicle width direction, of a seat back of a vehicle seat. This armrest includes movement allowing means for allowing the armrest to move toward the inside, in the vehicle width direction, when an impact load exceeding a predetermined value is applied to the armrest following a side impact with another vehicle.

According to the foregoing vehicle armrest, the movement allowing means allows the seated individual to move toward the inside, in the vehicle width direction, of the armrest side when an impact load which exceeds a predetermined value is applied to the armrest of the vehicle seat following a side impact with another vehicle. As a result, movement of the seated individual toward the inside, in the vehicle width direction, is ensured during a side impact with another vehicle while the same sense of stability as an armrest as a conventional armrest is able to be obtained during normal use at other times.

The foregoing vehicle armrest may also include an armrest frame in the armrest, and the movement allowing means may be provided on the armrest frame.

In the foregoing vehicle armrest, the armrest frame may have a weak portion that bends under an impact load exceeding a predetermined value, and the movement allowing means may be formed by this weak portion. In this case, when an impact load that exceeds a predetermined value is applied to the armrest of the vehicle seat following a side impact with another vehicle, the armrest frame bends toward the inside, in the vehicle width direction, at the weak portion, thus allowing the seated individual to move toward the inside, in the vehicle width direction, of the armrest side. As a result, movement of the seated individual toward the inside, in the vehicle width direction, is ensured during a side impact with another vehicle while the same sense of stability as an armrest as a conventional armrest is able to be obtained during normal use at other times.

Also, in the foregoing vehicle armrest, the armrest frame may include a plurality of members fastened together via a fastening portion that will break under an impact load exceeding a predetermined value, and the movement allowing means may be formed by that fastening portion. In this case, when an impact load which exceeds a predetermined value is applied to the armrest of the vehicle seat following a side impact with another vehicle, the armrest frame breaks at the fastening portion, thus allowing the seated individual to move toward the inside, in the vehicle width direction, of the armrest side. As a result, movement of the seated individual toward the inside, in the vehicle width direction, is ensured during a side impact with another vehicle while the same sense of stability as an armrest as a conventional armrest is able to be obtained during normal use at other times.

Furthermore, in the foregoing vehicle armrest, a connecting portion which connects a base end portion of the armrest frame to a support bracket on the seat back side may be structured so as to deform under an impact load exceeding a predetermined value, and the movement allowing means may be formed by this connecting portion. In this case, when an impact load that exceeds a predetermined value is applied to the armrest of the vehicle seat following a side impact with another vehicle, the connecting portion of the base end portion deforms so that the armrest frame tilts toward the inside, in the vehicle width direction, thus allowing the seated individual to move toward the inside, in the vehicle width direction, of the armrest side. As a result, movement of the seated individual toward the inside, in the vehicle width direction, is ensured during a side impact with another vehicle while the same sense of stability as an armrest as a conventional armrest is able to be obtained during normal use at other times.

The foregoing vehicle armrest may also include side impact detecting means for detecting a side impact with another vehicle, and a detachable mechanism provided on a pivot bracket in the seat back, and this detachable mechanism may be structured so as to separate the armrest from the pivot bracket by an operation of the side impact detecting means.

In the foregoing vehicle armrest, when the side impact detecting means detects a side impact with another vehicle, the detachable mechanism enables the armrest to separate from the pivot bracket in the seat back. As a result, the individual seated in the vehicle seat can move toward the inside, in the vehicle width direction, while causing the armrest to separate.

According to the foregoing vehicle armrest, when an impact load that exceeds a predetermined value is applied to the armrest of the vehicle seat following a side impact with another vehicle, the movement allowing means allows the seated individual to move toward the inside, in the vehicle width direction, of the armrest side. As a result, movement of the seated individual toward the inside, in the vehicle width direction, is ensured during a side impact with another vehicle while the same sense of stability as an armrest as a conventional armrest is able to be obtained during normal use at other times.

DETAILED DESCRIPTION OF THE PREFERRED EMBODIMENTS

Figure 1:
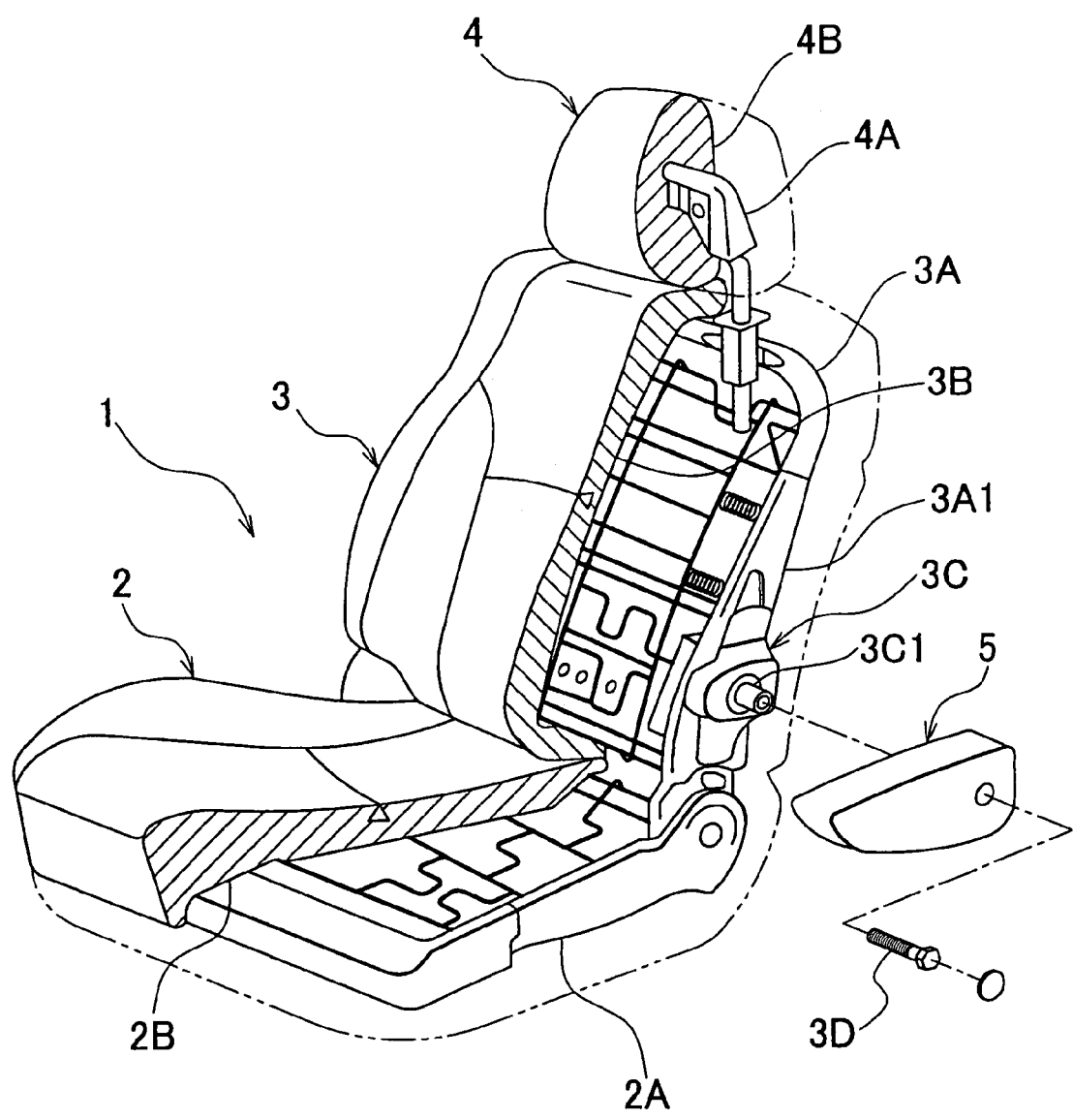
FIG. 1 is a cutaway perspective view of a vehicle seat, and the inner structure thereof, to which a vehicle armrest according to the example embodiments of the invention has been applied.

Hereinafter, example embodiments of the vehicle armrest according to the invention will be described in order with reference to the accompanying drawings. FIG. 1 in the drawings is a cutaway perspective view of a vehicle seat, and the inner structure thereof, to which a vehicle armrest according to the example embodiments of the invention has been applied.

A vehicle seat 1 shown in FIG. 1 is a driver's seat that is arranged on the front right side, for example, in a cabin of a vehicle, not shown. A seat back 3 is connected, so as to be able to tilt forward and backward, to a rear portion of a seat cushion 2. A head rest 4 is detachably mounted to an upper portion of this seat back 3. A vehicle armrest 5 according to a first example embodiment is mounted, so as to be able to be raised and lowered, to a left side portion toward the inside in the vehicle width direction, of the seat back 3.

Figure 2:
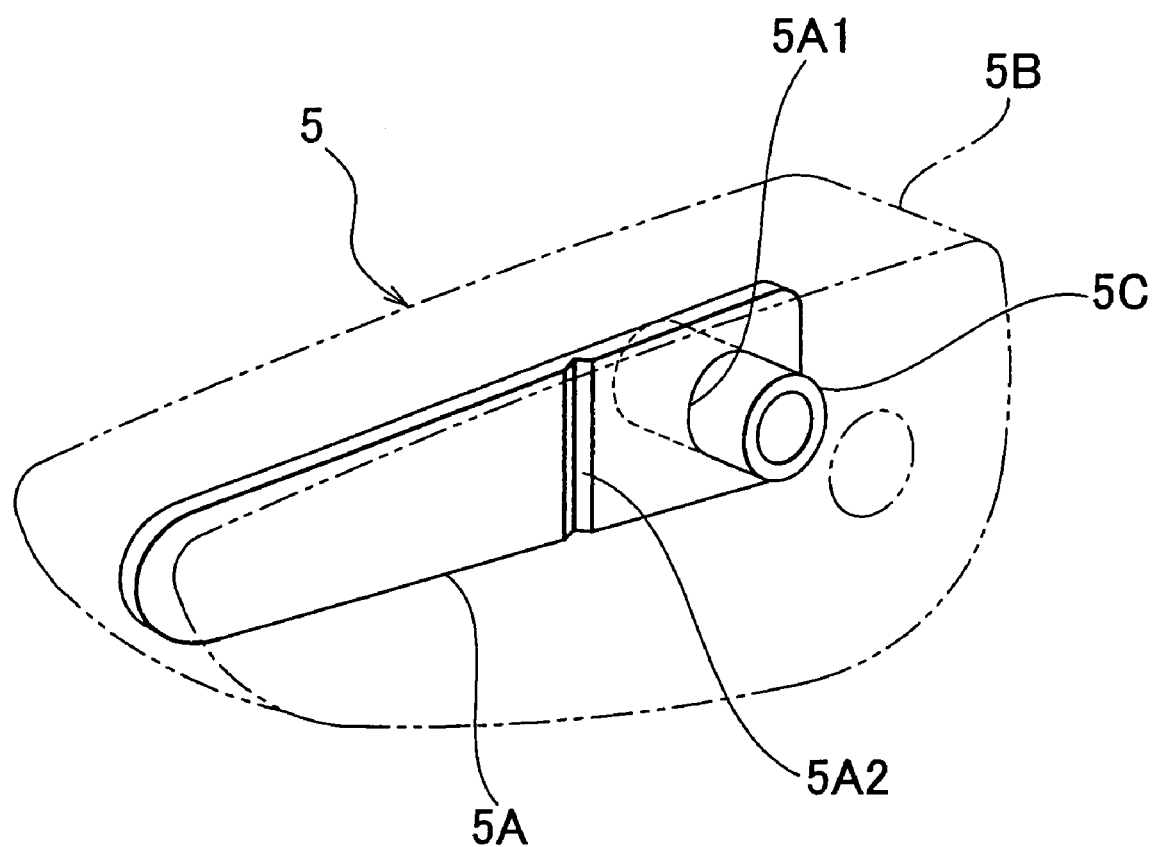
FIG. 2 is a perspective view of the structure of an armrest frame in the vehicle armrest according to a first example embodiment of the invention.

The seat cushion 2 has a structure in which a seat cushion frame 2A, which serves as the framework of the seat cushion 2, is covered by a seat cushion pad 2B. Similarly, the seat back 3 has a structure in which a seat back frame 3A, which serves as the framework of the seat back 3, is covered by a seat back pad 3B, and the head rest 4 has a structure in which a head rest frame 4A, which serves as the framework of the head rest 4, is covered by a head rest pad 4B. As shown in FIG. 2, the armrest 5 has a structure in which an armrest frame 5A, which serves as the framework of the armrest 5, is covered by an armrest pad 5B.

As shown in FIG. 1, the armrest 5, is mounted, so as to be able to raised and lowered, to the left side portion of the seat back 3. A pivot bracket (support bracket) 3C is fixed to a left side frame 3A1 of the seat back frame 3A in the seat back 3. A support shaft portion 3C1 is formed protruding on the pivot bracket 3C. An insertion hole 6A1 is formed in a location corresponding to the support shaft portion 3C1 in a base end portion of the armrest frame 5A in the armrest 5, as shown in FIG. 2. A boss member 5C is fixed inserted into this insertion hole 5A1.

The boss member 5C is rotatably fitted onto the support shaft portion 3C1 of the pivot bracket 3C shown in FIG. 1, and is kept from slipping off of the support shaft portion 3C1 by a fixing bolt 3D which screws into the support shaft portion 3C1. A holding mechanism, not shown, is provided between the boss member 5C and the pivot bracket 3C in order to hold the armrest 5 in an in-use position, in which the armrest 5 is lowered substantially horizontal with respect to the longitudinal direction of the vehicle, and a stored position, in which the armrest 5 is raised substantially vertical with respect the longitudinal direction of the vehicle.

In the vehicle armrest 5 according to the first example embodiment shown in FIG. 2, the armrest frame 5A is formed of thick synthetic resin plate material, and the boss member 5C is made of metal pipe material. The boss member 5C is either adhered or welded to the armrest frame 5A. A hinge groove 5A2 which has a V-shaped cross-section is formed in a direction orthogonal to the length direction of the armrest frame 5A in the surface of a portion of the armrest frame 5A that is toward the base end portion on the boss member 5C side. This hinge groove 5A2 forms a weak portion which serves as movement allowing means.

The strength of this weak portion formed by the hinge groove 5A2 in the armrest frame 5A is set so that the armrest frame 5A bends at the hinge groove 5A2 when an impact load exceeding a predetermined value is applied to the armrest frame 5A in the armrest 5 of the vehicle seat 1 (see FIG. 1) when another vehicle has collided with the driver's side of the vehicle, not shown.

Figure 3:
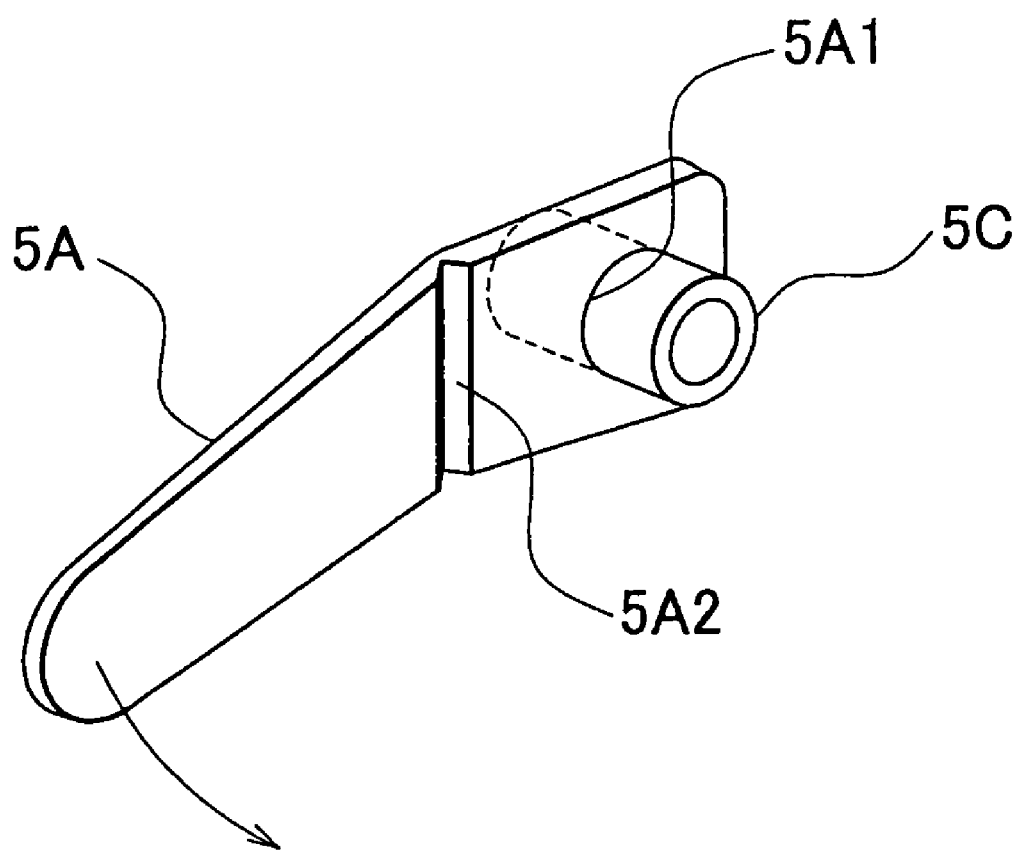
FIG. 3 is a perspective view of the operation of the armrest frame shown in FIG. 2.

With the armrest 5 according to the first example embodiment structured as described above, when another vehicle collides with the driver's side of the vehicle, not shown, and an impact load exceeding a predetermined value is applied to the armrest frame 5A in the armrest 5 of the vehicle seat 1 (see FIG. 1), the armrest frame 5A bends toward the inside, in the vehicle width direction, at the hinge groove 5A2 which serves as a weak portion, as shown by the arrow in FIG. 3. As a result, the vehicle armrest 5 according to the first example embodiment allows the upper body of a seated individual to move toward the inside, in the vehicle width direction, of the armrest 5 side.

Thus, the armrest 5 according to the first example embodiment is able to ensure movement of an individual seated in the vehicle seat 1 toward the inside, in the vehicle width direction, during a side impact with another vehicle. In addition, the armrest 5 is able to provide the same sense of stability as an armrest as a conventional armrest during normal use at times other than when there is a side impact with another vehicle.

Figure 4:
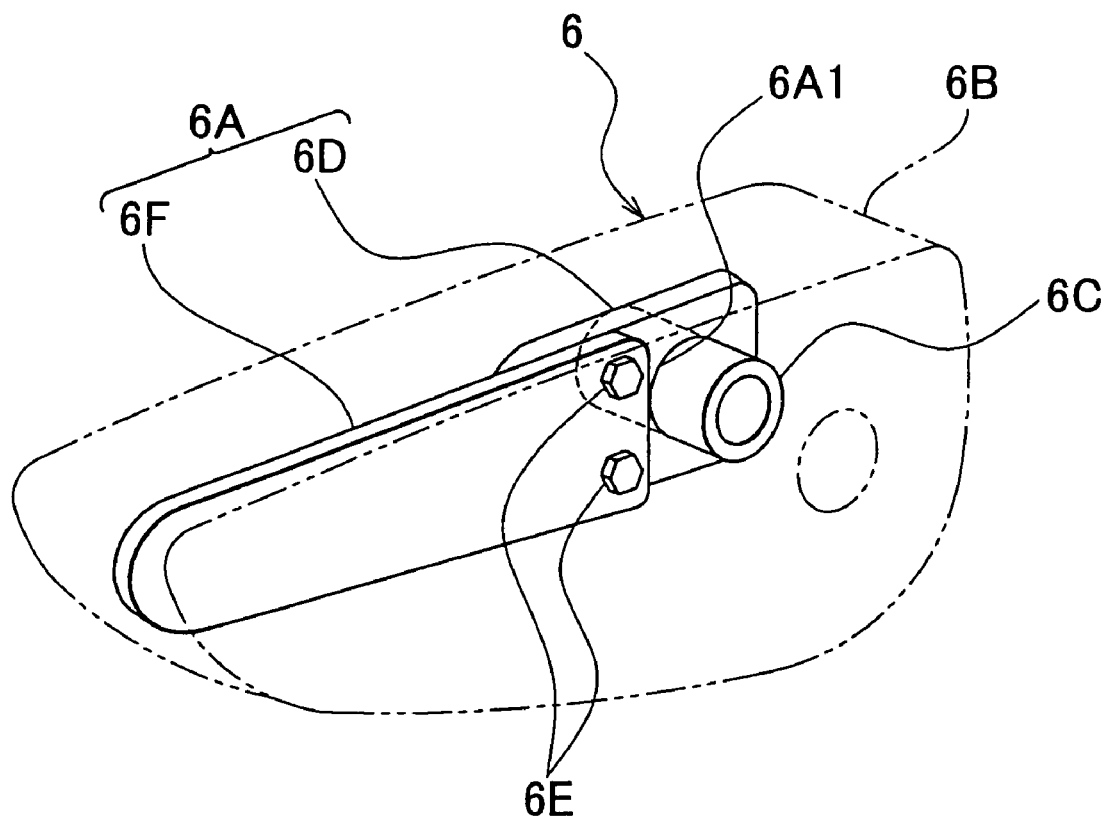
FIG. 4 is a perspective view of the structure of an armrest frame in a vehicle armrest according to a second example embodiment of the invention.
Figure 5:
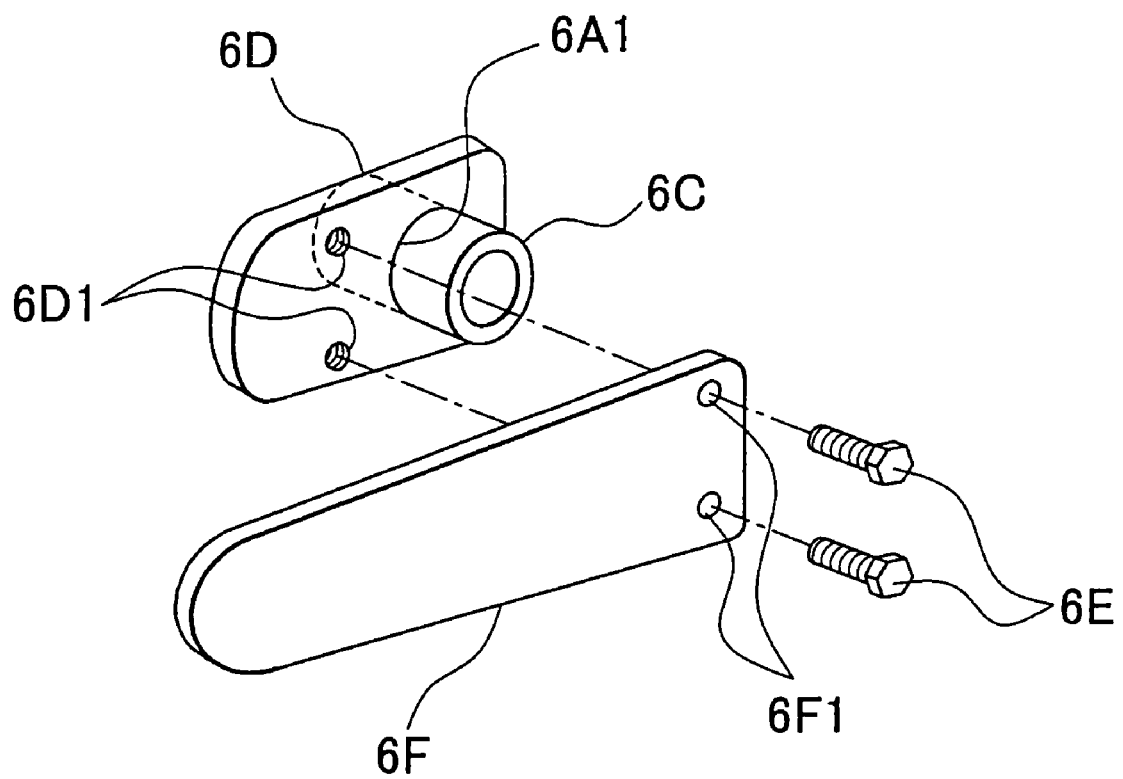
FIG. 5 is an exploded perspective view of the structure of the armrest frame shown in FIG. 4.
Figure 6:
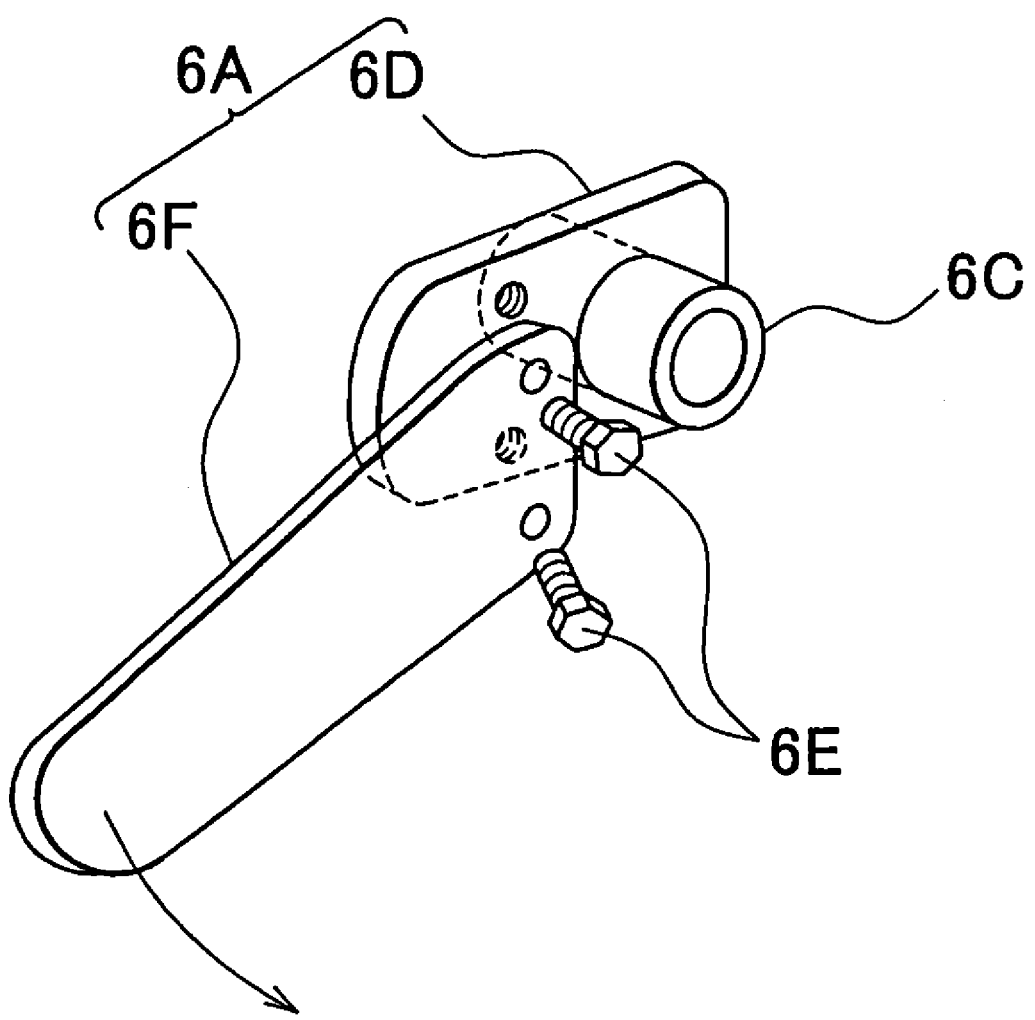
FIG. 6 is a perspective view of the operation of the armrest frame shown in FIG. 4.

FIGS. 4 to 6 show a vehicle armrest 6 according to a second example embodiment. This vehicle armrest 6 includes an armrest frame 6A, an armrest pad 6B, and a boss member 6C which correspond to the armrest frame 5A, the armrest pad 5B, and the boss member 5C, respectively, of the vehicle armrest 5 according to the foregoing first example embodiment. The armrest pad 6B has the same structure as the armrest pad 5B, and the boss member 6C has the same structure as the boss member 5C.

As shown in FIGS. 4 and 5, however, the synthetic resin armrest frame 6A is formed by two members, one of which is a base end side frame 6D, to which the boss member 6C is fixed inserted into an insertion hole 6A1, and the other of which is a tip end side frame 6F that is fastened to this base end side frame 6D with fastening bolts 6E and 6E. Insertion holes 6F1 and 6F1 for the fastening bolts 6E and 6E are formed in the tip end side frame 6F, and screw holes 6D1 and 6D1 for the fastening bolts 6E and 6E are formed in the base end side frame 6D.

The fastening bolts 6E and 6E, which fasten the tip end side frame 6F to the base end side frame 6D, are made of synthetic resin which is not as strong as steel. Therefore, these fastening bolts 6E and 6E serve as the movement allowing means at the fastening portion of the armrest frame 6A. The strength of these fastening bolts 6E and 6E is such that they will break from the impact load when an impact load exceeding a predetermined value is applied to the tip end side frame 6F in the armrest 6 of the vehicle seat 1 (see FIG. 1) when another vehicle has collided with the driver's side of the vehicle, not shown.

With the vehicle armrest 6 according to the second example embodiment structured as described above, when another vehicle collides with the driver's side of the vehicle, not shown, and an impact load exceeding a predetermined value is applied to the tip end side frame 6F in the armrest 6 of the vehicle seat 1 (see FIG. 1), the fastening bolts 6E and 6E break, as shown in FIG. 6, and the tip end side frame 6F separates from the base end side frame 6D. As a result, the vehicle armrest 6 according to the second example embodiment allows the upper body of a seated individual to move toward the inside, in the vehicle width direction, of the armrest 6 side.

Thus, the armrest 6 according to the second example embodiment is able to ensure movement of an individual seated in the vehicle seat 1 toward the inside, in the vehicle width direction, during a side impact with another vehicle. In addition, the armrest 6 is also able to provide the same sense of stability as an armrest as a conventional armrest during normal use at times other than when there is a side impact with another vehicle.

Figure 7:
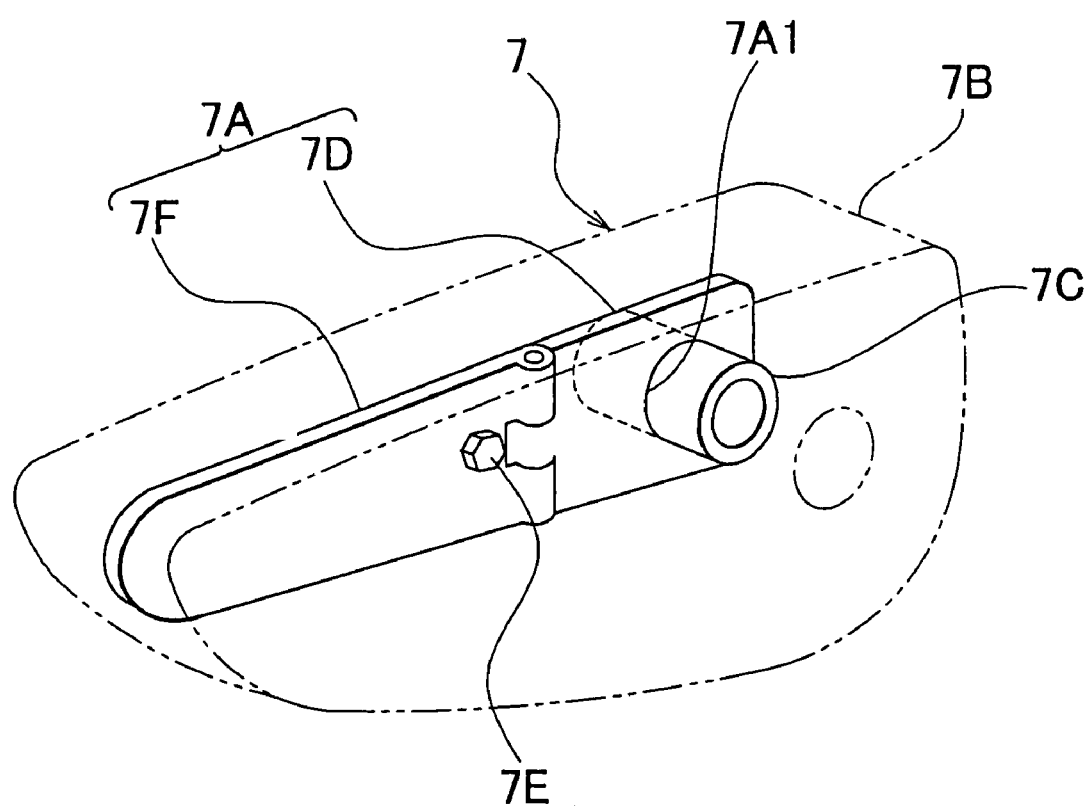
FIG. 7 is a perspective view of the structure of an armrest frame in a vehicle armrest according to a third example embodiment of the invention.
Figure 8:
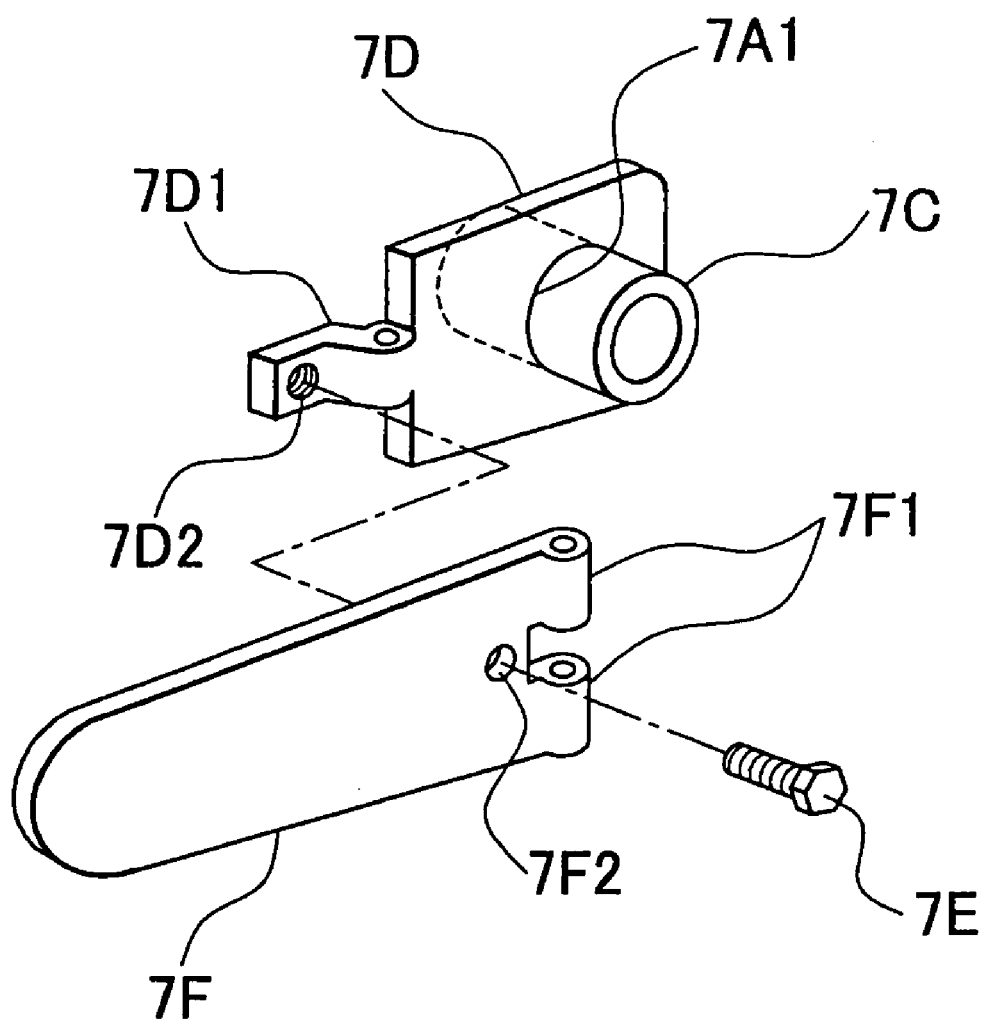
FIG. 8 is an exploded perspective view of the structure of the armrest frame shown in FIG. 7.
Figure 9:
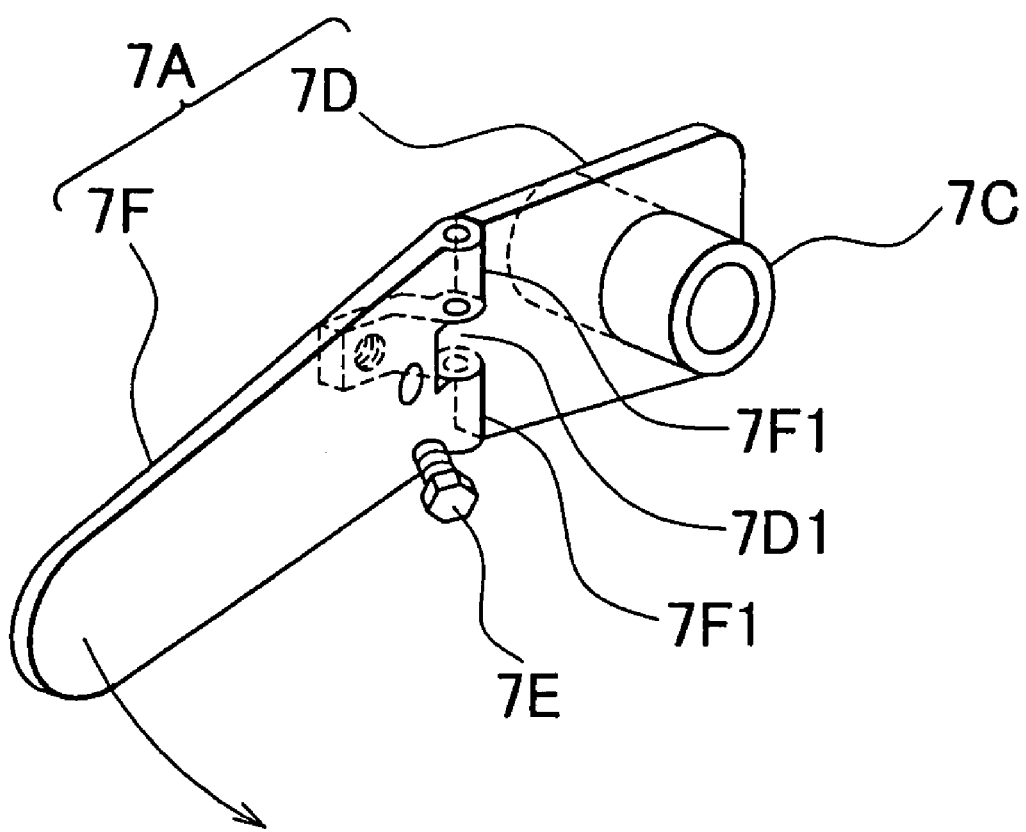
FIG. 9 is a perspective view of the operation of the armrest frame shown in FIG. 7.

FIGS. 7 to 9 show a vehicle armrest 7 according to a third example embodiment. This vehicle armrest 7 includes an armrest frame 7A, an armrest pad 7B, and a boss member 7C which correspond to the armrest frame 5A, the armrest pad 5B, and the boss member 5C, respectively, of the vehicle armrest 5 according to the foregoing first example embodiment. The armrest pad 7B has the same structure as the armrest pad 5B, and the boss member 7C has the same structure as the boss member 5C.

As shown in FIGS. 7 and 8, the synthetic resin armrest frame 7A is formed by two members, one of which is a base end side frame 7D, to which the boss member 7C is fixed inserted into an insertion hole 7A1, and the other of which is a tip end side frame 7F that is connected by a hinge to this base end side frame 7D and fastened with a fastening bolt 7E. A hinge piece 7D1 is formed protruding on a portion in the vertical center of the tip end portion of the base end side frame 7D. A pair of hinge pieces 7F1 and 7F1 which sandwich this hinge piece 7D1 are formed protruding on the base end portion of the tip end side frame 7F.

Also, an insertion hole 7F2 for the fastening bolt 7E is formed in the tip end side frame 7F, and a screw hole 7D2 for the fastening bolt 7E is formed in the tip end portion of the hinge piece 7D1 of the base end side frame 7D. The tip end portion of the hinge piece 7D1 of the base end side frame 7D is bent so as to overlap with the back side of the base end portion of the tip end side frame 7F and the screw hole 7D2 of the hinge piece 7D1 and the insertion hole 7F2 of the tip end side frame 7F align with each other when the base end side frame 7D and the tip end side frame 7F are extended in a straight line, as shown in FIG. 7.

The fastening bolt 7E, which fastens the tip end side frame 7F to the base end side frame 7D, is made of synthetic resin which is not as strong as steel. Therefore, this fastening bolt 7E serves as the movement allowing means at the fastening portion of the armrest frame 7A. The strength of this fastening bolt 7E is such that it will break from the impact load when an impact load exceeding a predetermined value is applied to the tip end side frame 7F in the armrest 7 of the vehicle seat 1 (see FIG. 1) when another vehicle has collided with the driver's side of the vehicle, not shown.

With the vehicle armrest 7 according to the third example embodiment structured as described above, when another vehicle collides with the driver's side of the vehicle, not shown, and an impact load exceeding a predetermined value is applied to the tip end side frame 7F in the armrest 7 of the vehicle seat 1 (see FIG. 1), the fastening bolt 7E breaks, as shown in FIG. 9, and the tip end side frame 7F rotates in the direction of the arrow at the portion where it is connected by the hinge to the base end side frame 7D. As a result, the vehicle armrest 7 according to the third example embodiment allows the upper body of a seated individual to move toward the inside, in the vehicle width direction, of the armrest 7 side.

Thus, the armrest 7 according to the third example embodiment can ensure movement of an individual seated in the vehicle seat 1 toward the inside, in the vehicle width direction, during a side impact with another vehicle. In addition, the armrest 7 is also able to provide the same sense of stability as an armrest as a conventional armrest during normal use at times other than when there is a side impact with another vehicle.

FIGS. 10 to 13 show a vehicle armrest 8 according to a fourth example embodiment. This vehicle armrest 8 includes an armrest frame 8A, an armrest pad 8B, and a boss member 8C which correspond to the armrest frame 5A, the armrest pad 5B, and the boss member 5C, respectively, of the vehicle armrest 5 according to the foregoing first example embodiment. The armrest pad 8B has the same structure as the armrest pad 5B, and the boss member 8C has the same structure as the boss member 5C.

Figure 10:
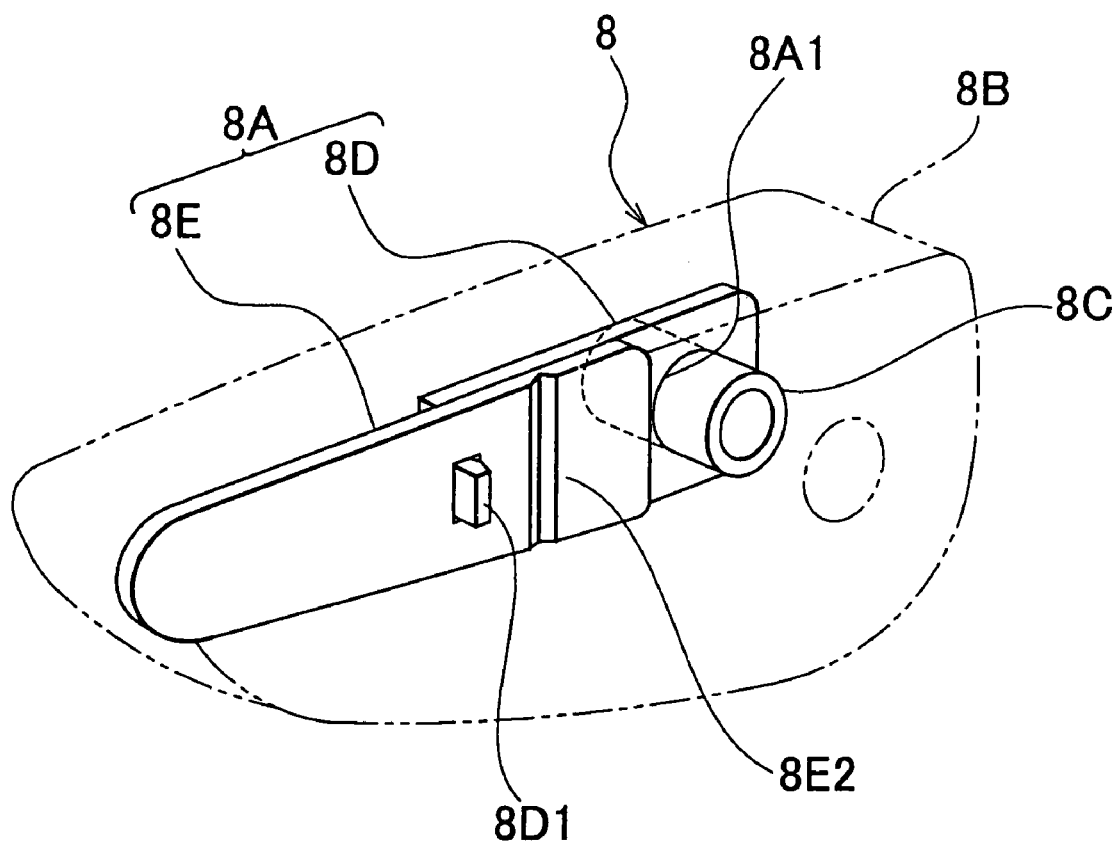
FIG. 10 is a perspective view of the structure of an armrest frame in a vehicle armrest according to a fourth example embodiment of the invention.
Figure 11:
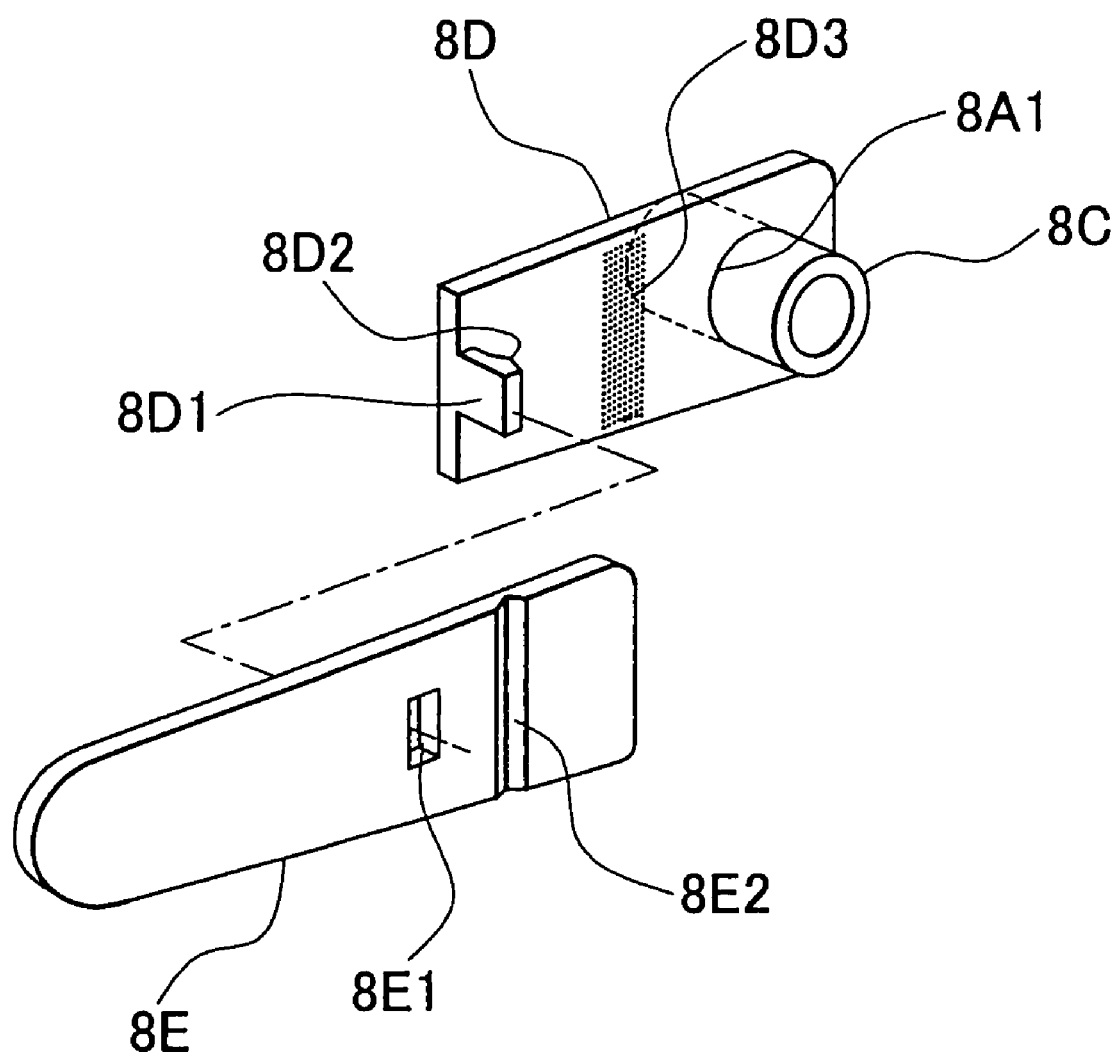
FIG. 11 is an exploded perspective view of the structure of the armrest frame shown in FIG. 10.

As shown in FIGS. 10 and 11, the synthetic resin armrest frame 8A is formed by two members, one of which is a base end side frame 8D, to which the boss member 8C is fixed inserted into an insertion hole 8A1, and the other of which is a tip end side frame 8E that is joined to this base end side frame 8D by welding or adhesion. A retaining pawl 8D1 is formed on the base end side frame 8D. This retaining pawl 8D1 protrudes from a portion on the front side in the vertical center of the tip end portion of the base end side frame 8D. A retaining protruding portion 8D2 which has a mountain-shaped cross-section that protrudes toward the boss member 8C side is formed on the inside surface of this retaining pawl 8D1. A joining portion 8D3 for welding or adhering the base end portion of the tip end side frame 8E is formed on the front surface of the base end side frame 8D between the retaining pawl 8D1 and the boss member 8C.

Meanwhile, an engaging window 8E1, which retains the retaining pawl 8D1 of the base end side frame 8D by the retaining protruding portion 8D2 when the retaining pawl 8D1 is inserted into the engaging window 8E1, is formed in the tip end side frame 8E. A hinge groove 8E2, which has a V-shaped cross-section just like the hinge groove 5A1 shown in FIG. 2, is formed orthogonal to the length direction of the tip end side frame 8E in a portion of the tip end side frame 8E that is farther toward the base end side than the engaging window 8E1, and farther toward the tip end side of the base end side frame 8D than the joining portion 8D3. This hinge groove 8E2 serves as the weak portion, i.e., the movement allowing means.

The engaging force of the engaging window 8E1 of the tip end side frame 8E with respect to the retaining pawl 8D1 of the base end side frame 8D is such that the engaging window 8E1 will separate from the retaining pawl 8D1 from the impact load when an impact load exceeding a predetermined value is applied to the tip end side frame 8E in the armrest 8 of the vehicle seat 1 (see FIG. 1) when another vehicle has collided with the driver's side of the vehicle, not shown.

Figure 12:
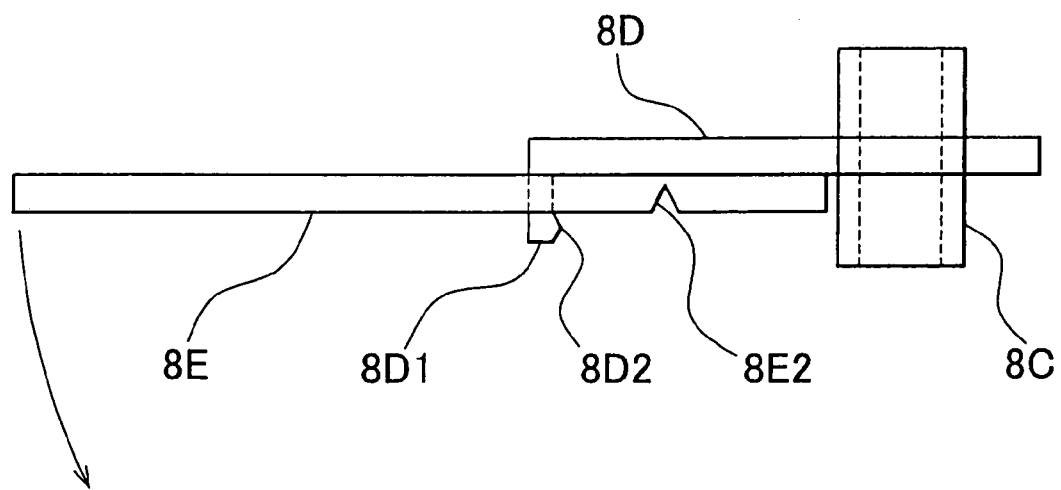
FIG. 12 is a top view of the structure of the armrest frame shown in FIG. 10.
Figure 13:
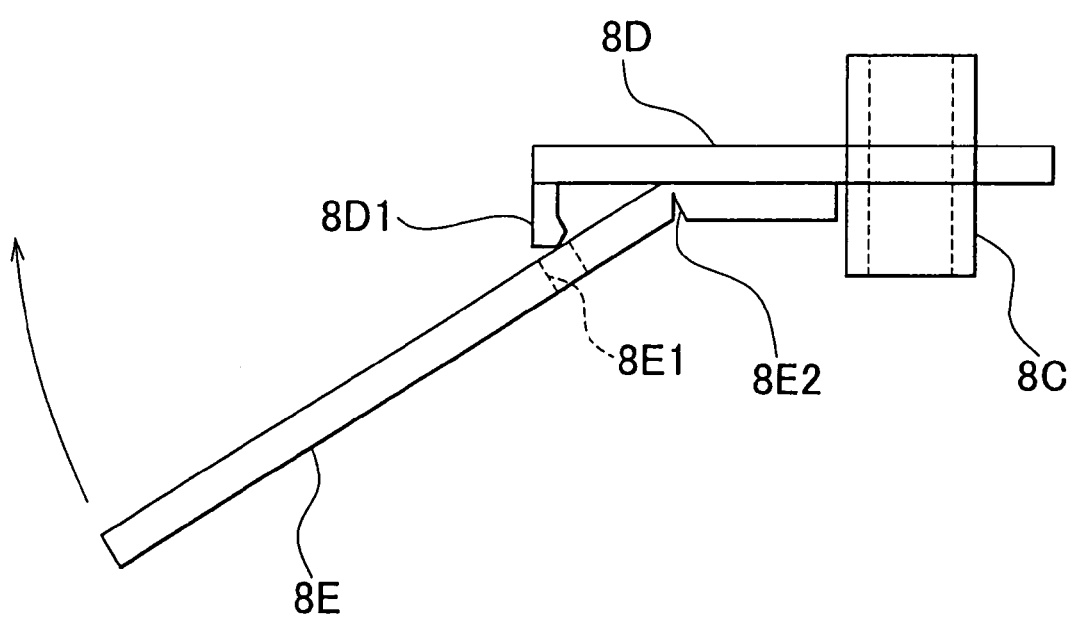
FIG. 13 is a perspective view of the operation of the armrest frame shown in FIG. 10.

With the vehicle armrest 8 according to the fourth example embodiment structured as described above, when another vehicle collides with the driver's side of the vehicle, not shown, and an impact load exceeding a predetermined value is applied to the tip end side frame 8E in the armrest 8 of the vehicle seat 1 (see FIG. 1), the tip end side frame 8E is pushed around in the direction of the arrow in FIG. 12. As a result, the engaging window 8E1 of the tip end side frame 8E separates from the retaining pawl 8D1 of the base end side frame 8D and the tip end side frame 8E bends toward the inside, in the vehicle width direction, at the hinge groove 8E2 which is the weak portion (see FIG. 13). In this way, the vehicle armrest 8 according to the fourth example embodiment allows the upper body of a seated individual to move toward the inside, in the vehicle width direction, of the armrest 8 side.

Thus, the armrest 8 according to the fourth example embodiment can ensure movement of an individual seated in the vehicle seat 1 toward the inside, in the vehicle width direction, during a side impact with another vehicle. In addition, the armrest 8 is also able to provide the same sense of stability as an armrest as a conventional armrest during normal use at times other than when there is a side impact with another vehicle. Moreover, the armrest 8 can easily return to its original position by pushing the tip end side frame 8E in the armrest 8 back and engaging the engaging window 8E1 with the retaining pawl 8D1 of the base end side frame 8D.

Figure 14:
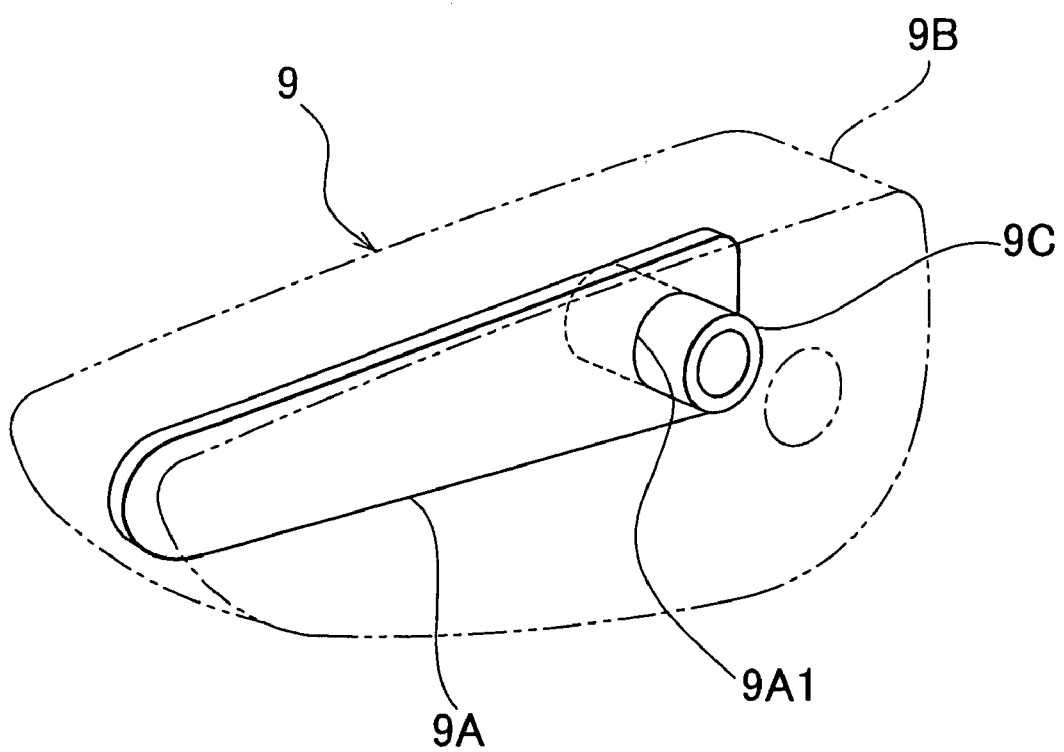
FIG. 14 is a perspective view of the structure of an armrest frame in a vehicle armrest according to a fifth example embodiment of the invention.
Figure 15:
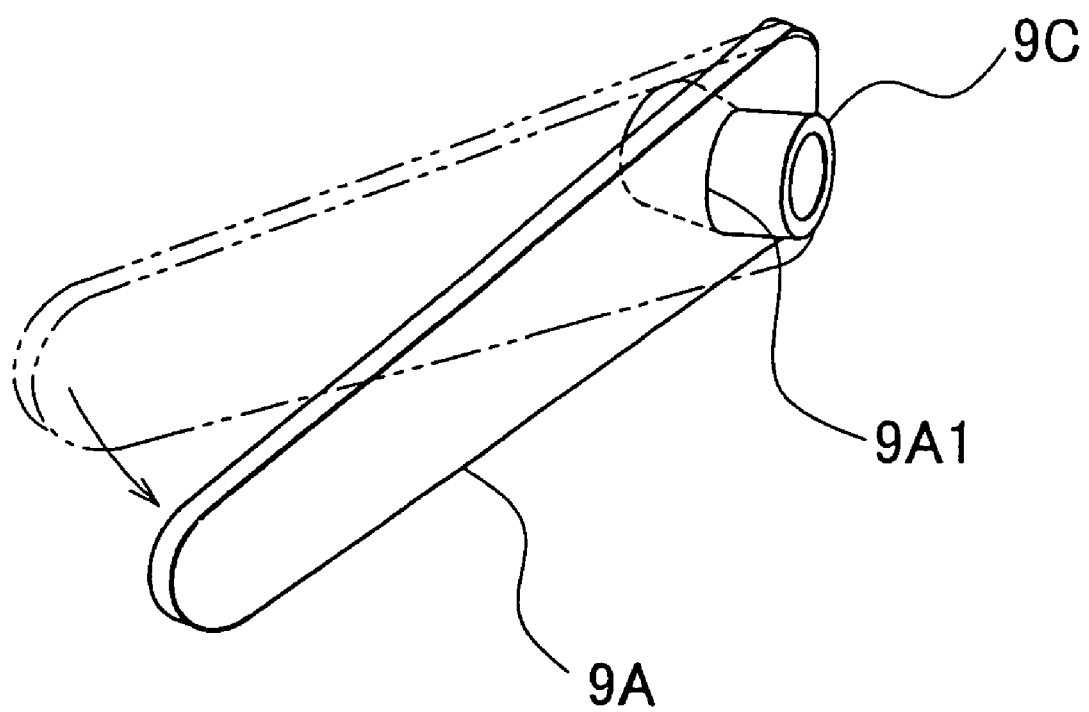
FIG. 15 is a perspective view of the operation of the armrest frame shown in FIG. 14.

FIGS. 14 to 15 show a vehicle armrest 9 according to a fifth example embodiment. This vehicle armrest 9 includes an armrest frame 9A, an armrest pad 9B, and a boss member 9C which correspond to the armrest frame 5A, the armrest pad 5B, and the boss member 5C, respectively, of the vehicle armrest 5 according to the foregoing first example embodiment. The armrest frame 9A is formed of thick synthetic resin plate material, just like the armrest frame 5A, and an insertion hole 9A1 into which the boss member 9C is fixed in an inserted state is formed in the base end portion of that armrest frame 9A. A hinge groove corresponding to the hinge groove 5A2 is not formed in the base end portion of the armrest frame 9A, however. Also, the armrest pad 9B has the same structure as the armrest pad 5B.

The connecting portion that connects the base end portion of the armrest frame 9A to the pivot bracket 3C on the seat back 3 side shown in FIG. 1, i.e., the boss member 9C which is inserted and fixed in the insertion hole 9A1 in the base end portion of the armrest frame 9A and rotatably fits on the support shaft portion 3C1 of the pivot bracket 3C, is made of synthetic resin that is not as strong as metal. This boss member 9C thus serves as the movement allowing means at the connecting portion of the base end portion of the armrest frame 9A. The strength of this boss member 9C is such that it will bend and deform from the moment produced by the impact load when an impact load exceeding a predetermined value is applied to the armrest frame 9A in the armrest 9 of the vehicle seat 1 (see FIG. 1) when another vehicle has collided with the driver's side of the vehicle, not shown.

With the vehicle armrest 9 according to the fifth example embodiment structured as described above, when another vehicle collides with the driver's side of the vehicle, not shown, and an impact load exceeding a predetermined value is applied to the armrest frame 9A in the armrest 9 of the vehicle seat 1 (see FIG. 1), the boss member 9C bends and deforms from the moment produced by that impact load, such that the armrest frame 9A tilts toward the inside, in the vehicle width direction, as shown by the arrow in FIG. 15. In this way, the vehicle armrest 9 according to the fifth example embodiment allows the upper body of a seated individual to move toward the inside, in the vehicle width direction, of the armrest 9 side.

Thus, the armrest 9 according to the fifth example embodiment ensures movement of an individual seated in the vehicle seat 1 toward the inside, in the vehicle width direction, during a side impact with another vehicle. In addition, the armrest 9 is also able to provide the same sense of stability as an armrest as a conventional armrest during normal use at times other than when there is a side impact with another vehicle.

Figure 16:
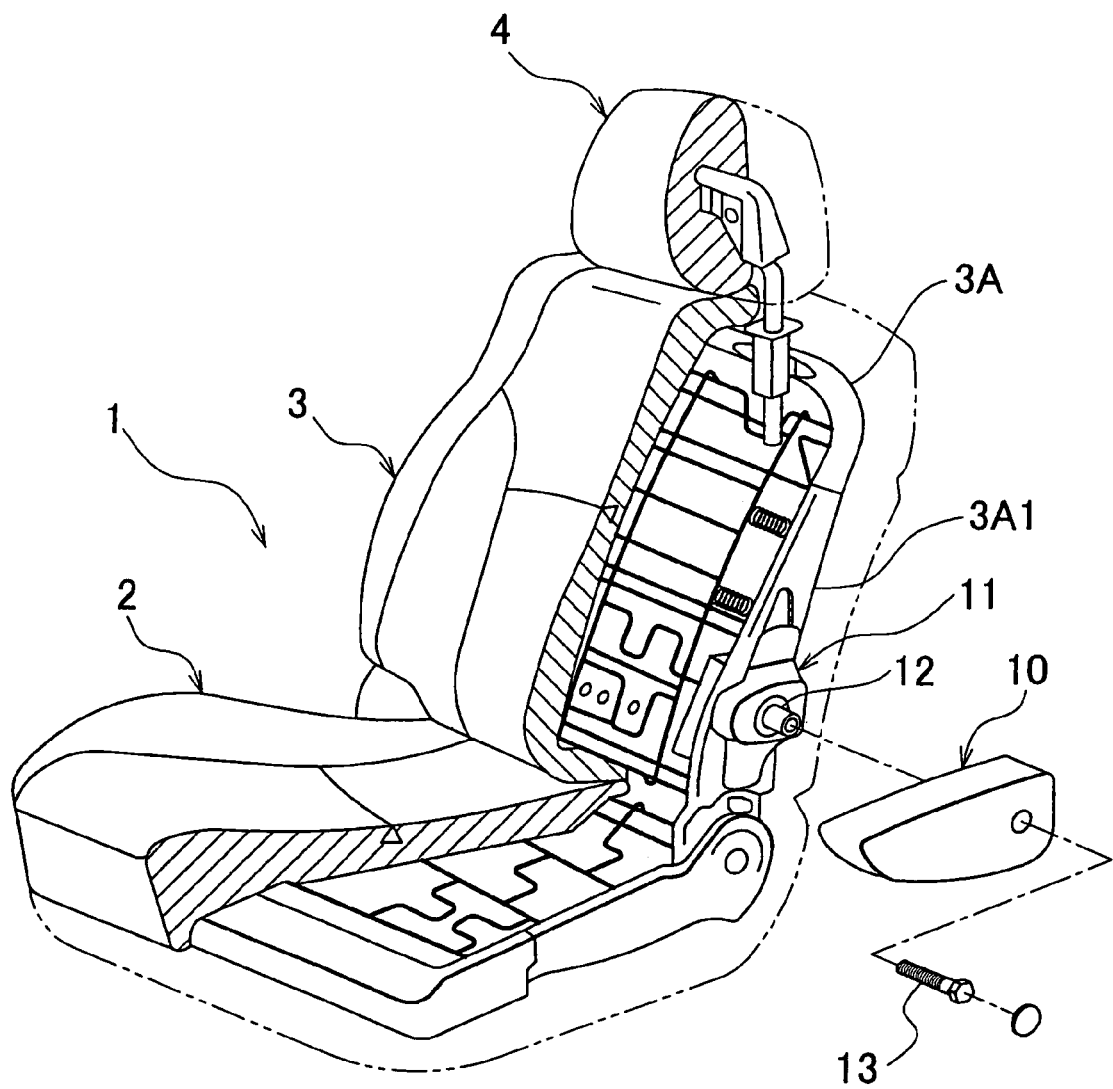
FIG. 16 is a cutaway perspective view of a vehicle seat corresponding to FIG. 1, showing a vehicle armrest according to a sixth example embodiment of the invention.

FIG. 16 shows a vehicle armrest 10 according to a sixth example embodiment. This vehicle armrest 10 is mounted, so as to be able to be raised and lowered, to a left side portion, toward the inside in the vehicle width direction, of the seat back 3, just like the vehicle armrest 5 according to the first example embodiment shown in FIG. 1. Here, the armrest 10 is detachably mounted via a detachable mechanism 12 to a pivot bracket 11 that is fixed to the left side frame 3A1 of the seat back frame 3A in the seat back 3. The structural parts that are the same as those in FIG. 1 will be denoted by the same reference numerals in FIG. 16, and detailed descriptions thereof will be omitted.

Figure 17:
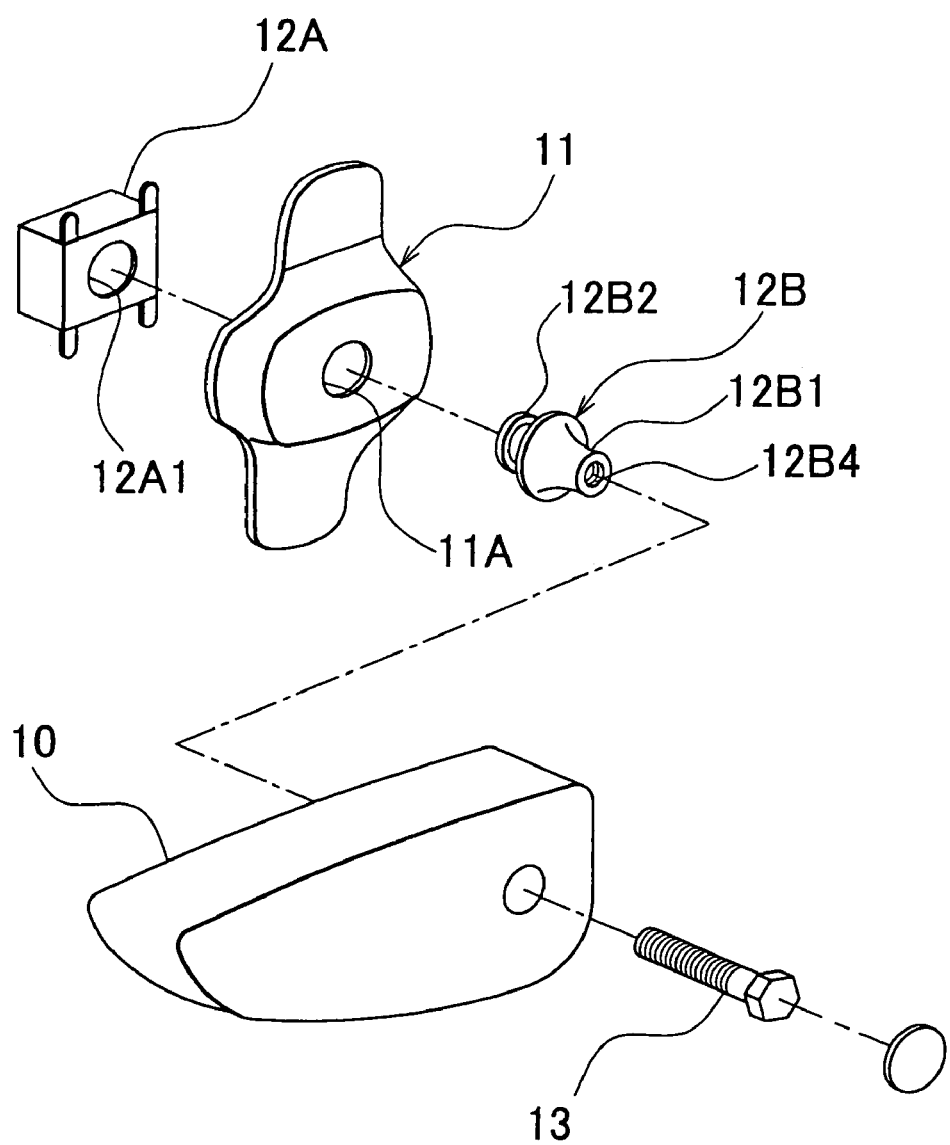
FIG. 17 is an exploded perspective view of the structure of a detachable mechanism, together with the armrest and a pivot bracket shown in FIG. 16.
Figure 18:
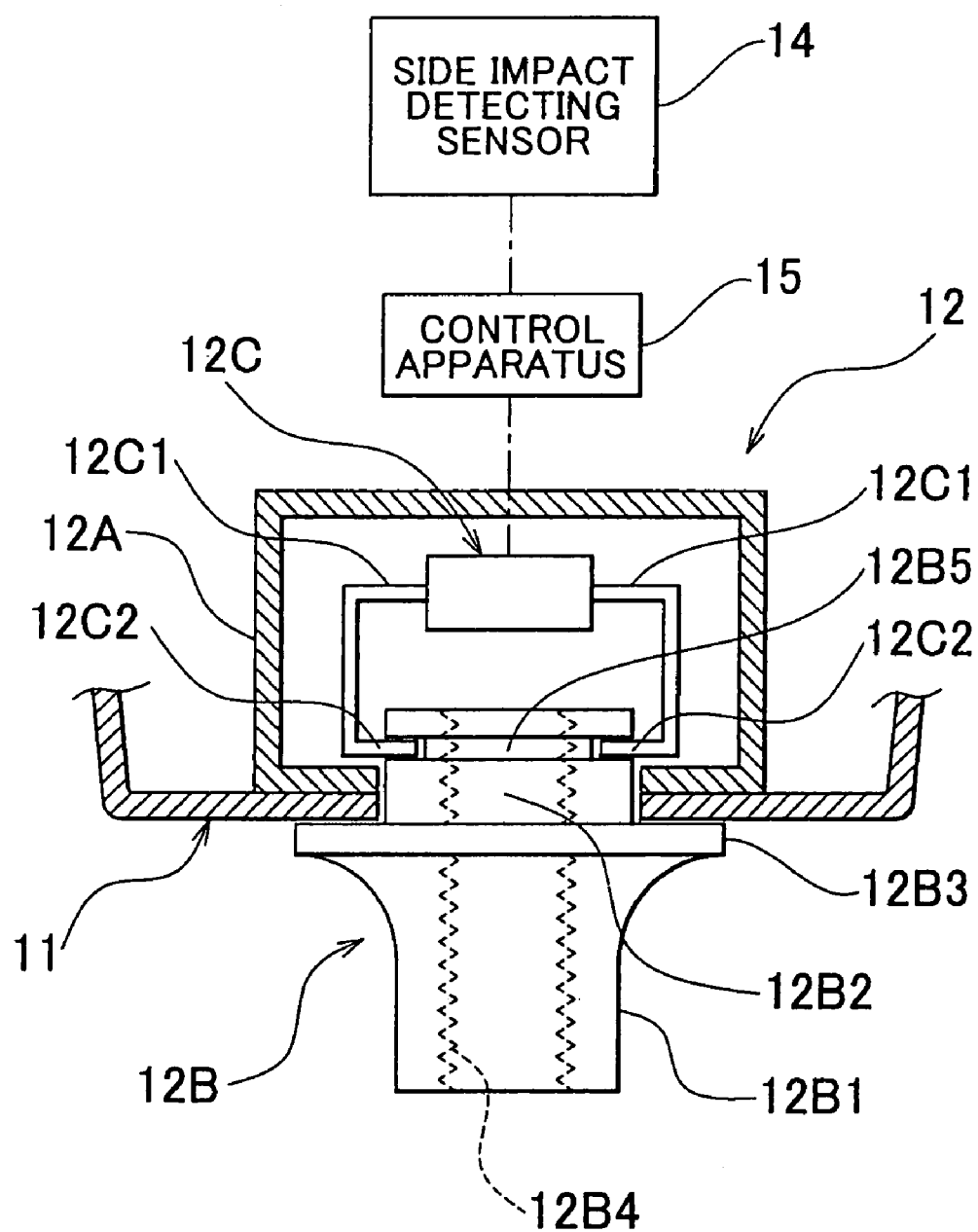
FIG. 18 is a sectional view of the structure of the detachable mechanism shown in FIG. 16.

As shown in FIGS. 17 and 18, the detachable mechanism 12 includes a case 12A that is fixed to the inside surface of the pivot bracket 11 and a support shaft member 12B that is detachably mounted to this case 12A. A solenoid plunger 12C for detachably mounting the support shaft member 12B is disposed inside the case 12A.

The support shaft member 12B is a member that rotatably supports a boss member that is fixed to a base end portion of an armrest frame, not shown, in the armrest 10. A support shaft portion 12B1 that rotatably fits into the boss member, not shown, is formed on the tip end portion of the support shaft member 12B. A mounting shaft portion 12B2, which inserts into both a mounting hole 11A formed in the pivot bracket 11 and a mounting hole 12A1 formed in the case 12A, is formed in the base end portion of the support shaft member 12B. A flange 12B3 which abuts against the outer surface of the pivot bracket 11 is formed between the support shaft portion 12B1 and the mounting shaft portion 12B2.

Also, a screw hole 12B4, into which a fixing bolt 13 is screwed to prevent the boss member, not shown, which is rotatably fitted over the support shaft portion 12B1 from slipping off of the support shaft portion 12B1, is formed in the support shaft member 12B. A ring-shaped engaging groove 12B5 is formed in the outer periphery of the mounting shaft portion 12B2 of the support shaft member 12B.

Meanwhile, the solenoid plunger 12C in the case 12A has a pair of plunger arms 12C1 and 12C1 that extend in opposite directions from both end portions when the solenoid plunger 12C is operated. The tip end sides of these plunger arms 12C1 and 12C1 are curved in a sideways U shape. Retaining pawls 12C2 and 12C2 are formed on the tip end portions of these plunger arms 12C1 and 12C1. These retaining pawls 12C2 and 12C2 fit into the engaging groove 12B5 of the support shaft member 12B from both sides so as to detachably retain the mounting shaft portion 12B2.

A side G sensor 14 which detects a side impact with another vehicle, and a control apparatus 15 which inputs a detection signal from this side G sensor 14 are provided as side impact detecting means. The control apparatus 15 is structured to control the operation of the solenoid plunger 12C.

The control apparatus 15 is formed using software and microcomputer hardware such as an ECU (Electric Control Unit), not shown, mounted in the vehicle. The hardware includes, for example, an input/output interface I/O, an A/D converter, ROM (Read Only Memory) in which programs and data are stored, RAM (Random Access Memory) which temporarily stores input data and the like, and a CPU (Central Processing Unit) which executes programs.

This control apparatus 15 is structured such that when a detection signal indicative of a side impact with another vehicle is input from the side G sensor 14, the control apparatus 15 operates the solenoid plunger 12C by energizing it so that the pair of plunger arms 12C1 and 12C1 extend in opposite directions from both end portions of the solenoid plunger 12C.

With the armrest 10 according to the sixth example embodiment structured as described above, when another vehicle collides with the driver's side of the vehicle, not shown, and an impact load exceeding a predetermined value is applied, the side G sensor 14 outputs a side impact detection signal to the control apparatus 15 and the control apparatus 15 operates the solenoid plunger 12C by energizing it. As a result, the pair of plunger arms 12C1 and 12C1 of the solenoid plunger 12C extend in opposite directions and the retaining pawls 12C2 and 12C2 at the tip ends of those plunger arms 12C1 and 12C1 separate from the engaging groove 12B5 in the support shaft member 12B.

Figure 19:
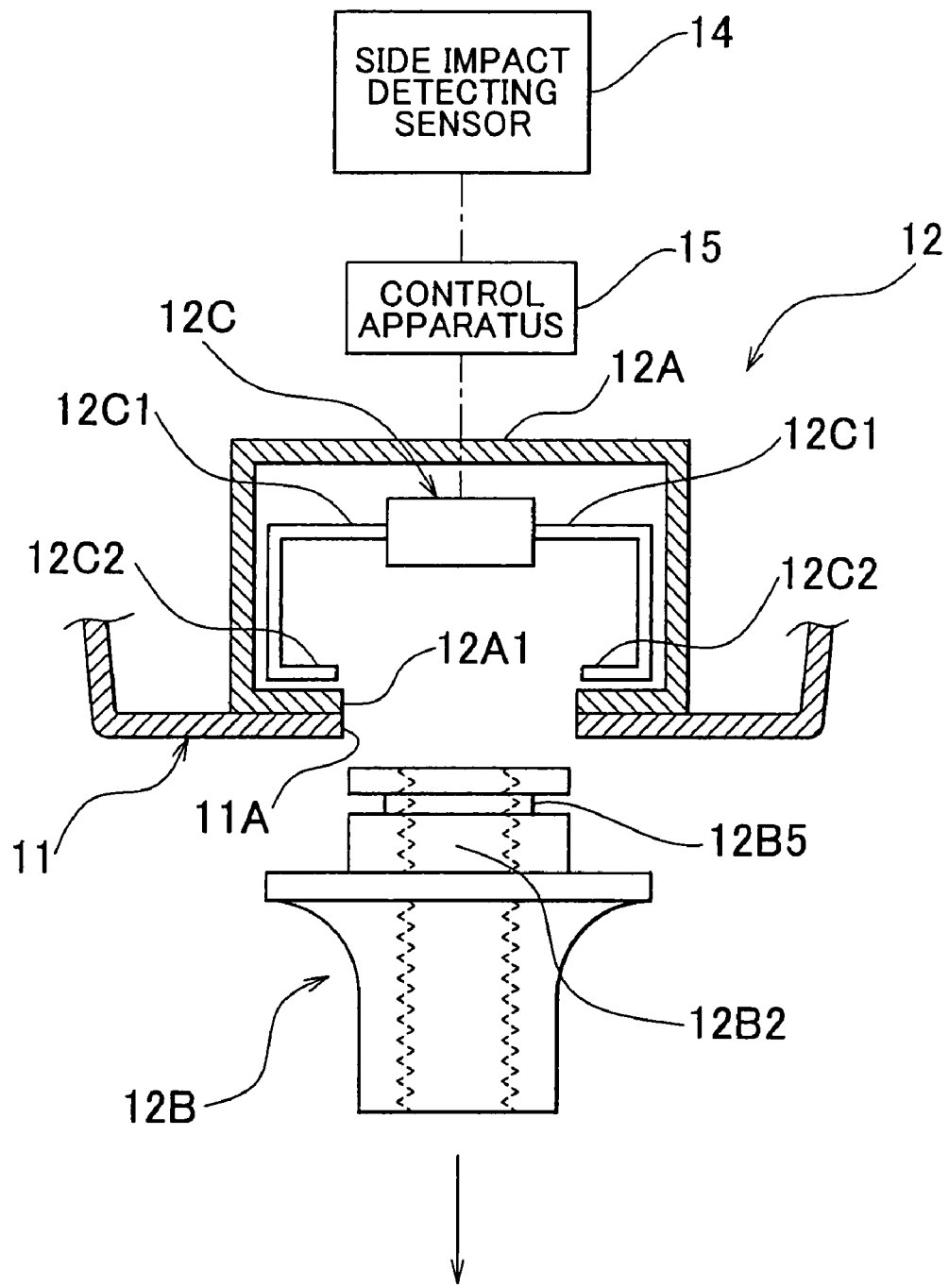
FIG. 19 is a sectional view of the operation of the detachable mechanism shown in FIG. 18.

Here, when an impact load is applied to the armrest 10 of the vehicle seat 1 (see FIG. 16), the mounting shaft portion 12B2 of the support shaft member 12B which is connected to the armrest 10 by the fixing bolt 13 comes out of the mounting hole 12A1 of the case 12A and the mounting hole 11A of the pivot bracket 11, as shown by FIG. 19. As a result, the individual seated in the vehicle seat 1 (see FIG. 16) is able to move toward the inside, in the vehicle width direction, while causing the armrest 10 to separate. Thus, the armrest 10 according to the sixth example embodiment can ensure movement of an individual seated in the vehicle seat 1 (see FIG. 16) toward the inside, in the vehicle width direction, during a side impact with another vehicle. In addition, the armrest 10 is also able to provide the same sense of stability as an armrest as a conventional armrest during normal use at times other than when there is a side impact with another vehicle.

Figure 20:
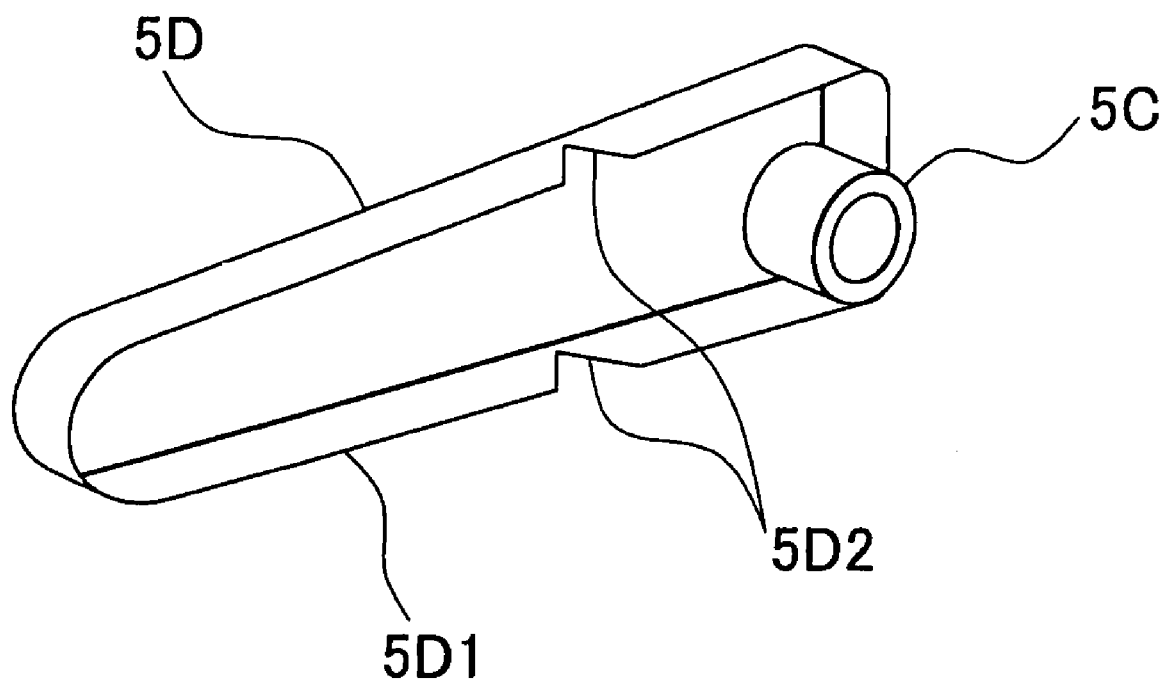
FIG. 20 is a perspective view of a first modified example of the armrest frame shown in FIG. 2.

The vehicle armrest according to the invention is not limited to the foregoing example embodiments. For example, the synthetic resin armrest frame 5A shown in FIG. 2 may be modified to a steel plate armrest frame 5D, as shown in FIG. 20, i.e., it may be modified to an armrest frame 5D in which a flange 5D1 is machined on the peripheral edge portion. In this case, a vertical pair of V notches 5D2 may be formed in the flange 5D1 in positions corresponding to the hinge groove 5A2 shown in FIG. 2, such that these V notches 5D2 serve as the weak portion, i.e., the movement allowing means.

Figure 21:
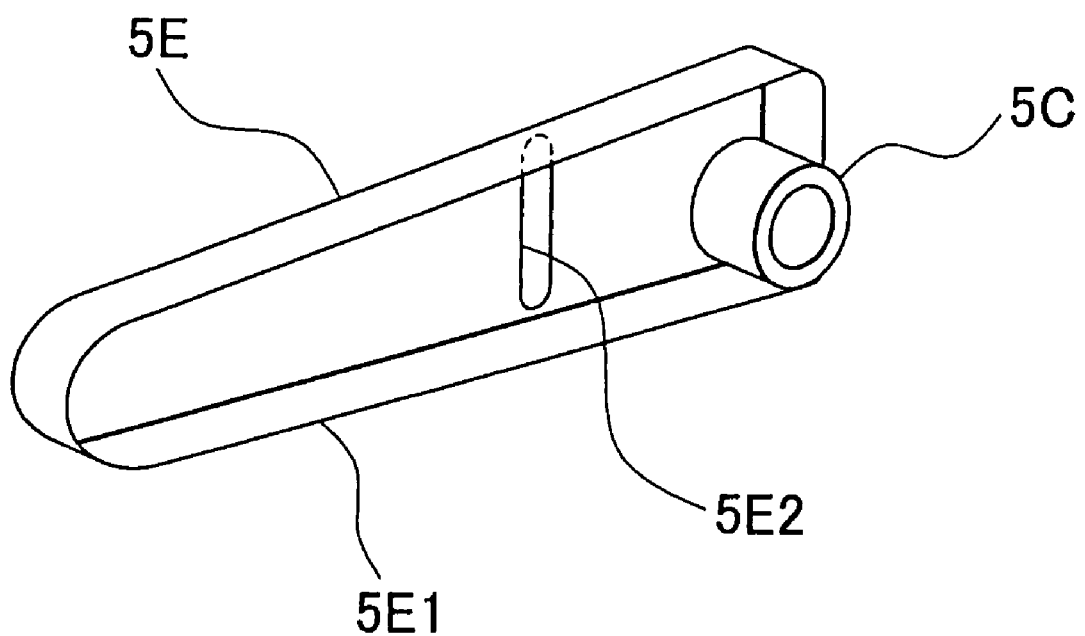
FIG. 21 is a perspective view of a second modified example of the armrest frame shown in FIG. 2.

The synthetic resin armrest frame 5A shown in FIG. 2 may also be modified to a steel plate armrest frame 5E, as shown in FIG. 21, i.e., it may be modified to an armrest frame 5E in which a flange 5E1 is machined on the peripheral edge portion. In this case, a slit or long hole 5E2 which extends vertically may be formed in a position corresponding to the hinge groove 5A2 shown in FIG. 2, such that this long hole 5E2 serves as the weak portion, i.e., the movement allowing means.

Further, the solenoid plunger 12C shown in FIG. 18 may be modified to a powder ignition device of a vehicle airbag apparatus, such that this powder ignition device separates the support shaft member 12B.

The invention claimed is:

1. A vehicle armrest mounted to a side portion on an inside, in a vehicle width direction, of a seat back of a vehicle seat, comprising:
   a movement allowing apparatus which allows the armrest to move toward the inside, in the vehicle width direction, when an impact load is applied to the armrest following a side impact, wherein a predetermined value is higher than an impact load which is applied to the armrest during normal use at times other than when there is a side impact; and
   an armrest frame in the armrest,
   wherein the movement allowing apparatus is provided on the armrest frame,
   wherein the movement allowing apparatus comprises a weak portion where the armrest frame bends under the impact load, and
   wherein the weak portion is a groove formed in a surface on an inside, in the vehicle width direction, of the armrest frame.

2. The vehicle armrest according to claim 1, wherein the movement allowing apparatus allows the armrest to move toward the inside, in the vehicle width direction, only when an impact load at the time of a side impact with another vehicle is applied to the armrest.

3. A vehicle armrest mounted to a side portion on an inside, in a vehicle width direction, of a seat back of a vehicle seat, comprising:
   a movement allowing apparatus which allows the armrest to move toward the inside, in the vehicle width direction, when an impact load is applied to the armrest following a side impact, wherein a predetermined value is higher than an impact load which is applied to the armrest during normal use at times other than when there is a side impact; and
   an armrest frame in the armrest,
   wherein the movement allowing apparatus is provided on the armrest frame, and
   wherein the armrest frame comprises a plurality of members fastened together via a fastening portion which breaks under the impact load, and the movement allowing apparatus comprises the fastening portion.

4. The vehicle armrest according to claim 3, wherein the fastening portion comprises a synthetic resin bolt which fastens the plurality of members together.

5. The vehicle armrest according to claim 4, wherein the fastening portion further comprises a hinge portion which rotatably supports each member of the plurality of members.

6. The vehicle armrest according to claim 3, wherein the fastening portion comprises a retaining pawl provided on the plurality of members, which connects the plurality of members together, and an engaging window formed in the plurality of members, which retains the retaining pawl.

7. A vehicle armrest mounted to a side portion on an inside, in a vehicle width direction, of a seat back of a vehicle seat, comprising:
 a movement allowing apparatus which allows the armrest to move toward the inside, in the vehicle width direction, when an impact load is applied to the armrest following a side impact, wherein a predetermined value is higher than an impact load which is applied to the armrest during normal use at times other than when there is a side impact; and
 an armrest frame in the armrest,
 wherein the movement allowing apparatus is provided on the armrest frame, and
 wherein the movement allowing apparatus comprises a connecting portion which connects a base end portion of the armrest frame to a support bracket on the seat back side and deforms under the impact load.

8. A vehicle armrest mounted to a side portion on an inside, in a vehicle width direction, of a seat back of a vehicle seat, comprising:
 a movement allowing apparatus which allows the armrest to move toward the inside, in the vehicle width direction, when an impact load is applied to the armrest following a side impact, wherein a predetermined value is higher than an impact load which is applied to the armrest during normal use at times other than when there is a side impact,
 wherein the movement allowing apparatus comprises a side impact detecting device that detects a side impact with another vehicle, and a detachable mechanism provided on a pivot bracket in the seat back; and the detachable mechanism separates the armrest from the pivot bracket by an operation of the side impact detecting device.

9. The vehicle armrest according to claim 8, wherein the side impact detecting device is a side G sensor which detects a side impact with another vehicle.

10. The vehicle armrest according to claim 8, wherein the detachable mechanism is a powder ignition device which separates the armrest from the pivot bracket by an operation of the side impact detecting device.

11. The vehicle armrest according to claim 8, wherein the detachable mechanism is a solenoid plunger which separates the armrest from the pivot bracket by an operation of the side impact detecting device.

12. A vehicle armrest mounted to a side portion on an inside, in a vehicle width direction, of a seat back of a vehicle seat, comprising:
 a side impact detecting device that detects a side impact with another vehicle; and
 a detachable mechanism provided on a pivot bracket in the seat back,
 wherein the detachable mechanism separates the armrest from the pivot bracket by an operation of the side impact detecting device.

13. A vehicle armrest mounted to a side portion on an interior, in a vehicle width direction, of a seat back of a vehicle seat, comprising:
 a movement allowing apparatus having a side impact detecting device that detects a side impact on the vehicle, and which allows the armrest to detach, when an impact load is applied to a side of the vehicle; and
 a detachable mechanism between the armrest and seat back;
 wherein the detachable mechanism separates the armrest from the seat back by operation of the side impact device when the side impact device detects the side impact.

* * * * *